C. L. WADE.
RIVETING MACHINE.
APPLICATION FILED JULY 3, 1914.
1,132,988.
Patented Mar. 23, 1915.
6 SHEETS—SHEET 2.
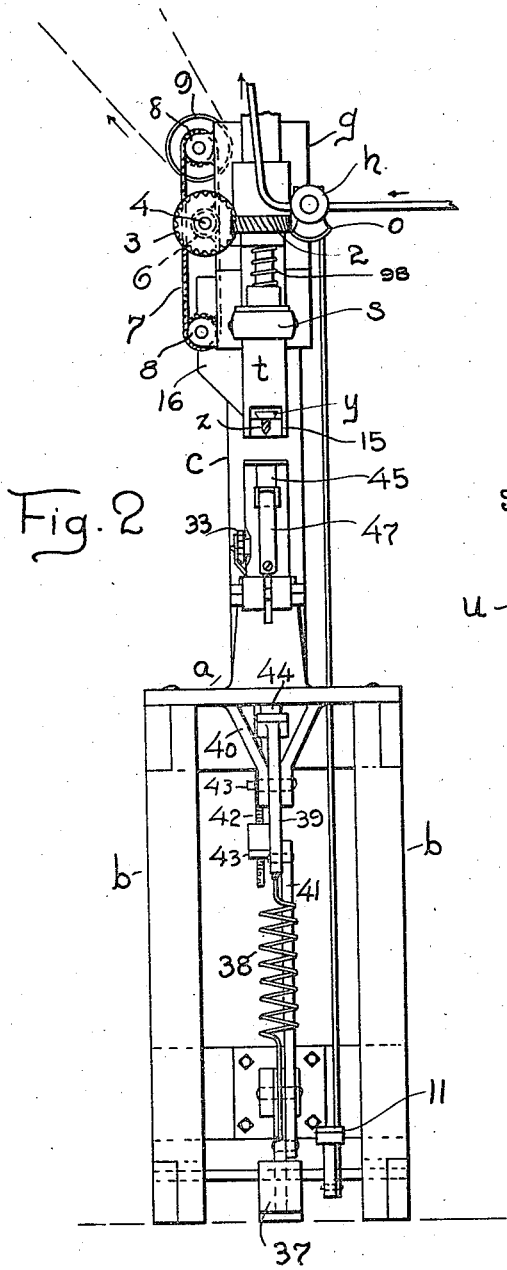
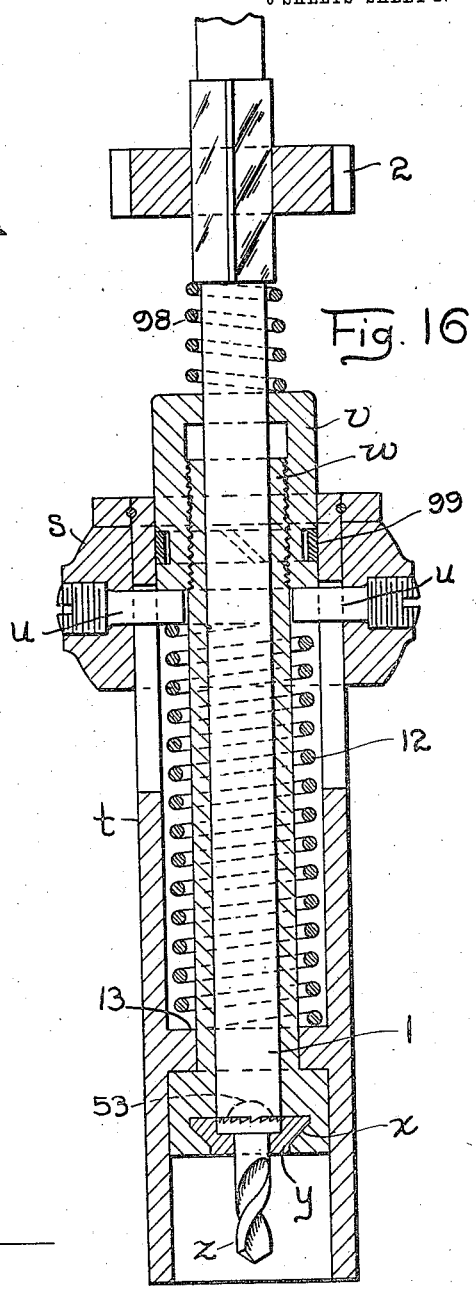

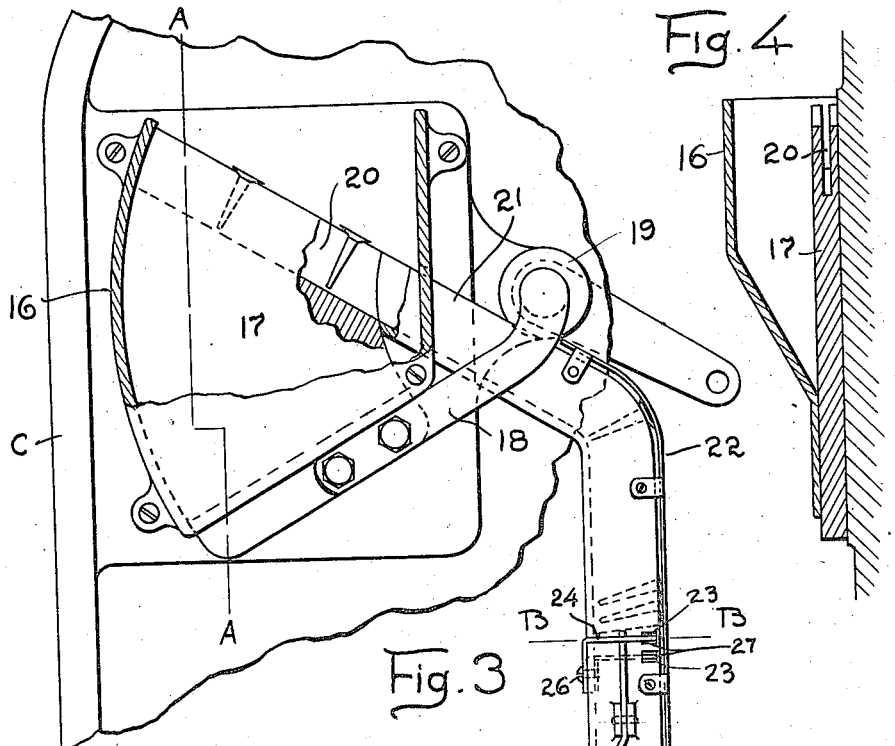
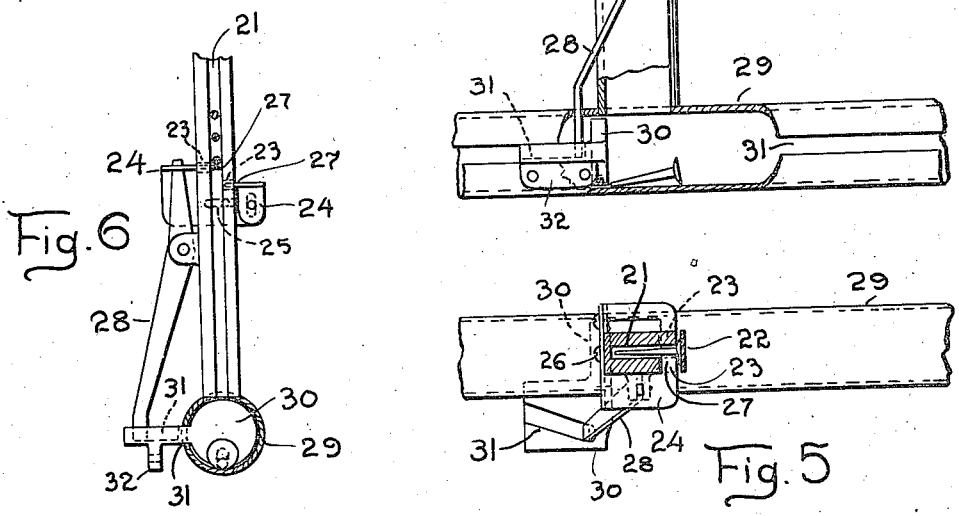

C. L. WADE.
RIVETING MACHINE.
APPLICATION FILED JULY 3, 1914.

1,132,988.

Patented Mar. 23, 1915.
6 SHEETS—SHEET 4.

WITNESSES

INVENTOR
Ceylon L. Wade
BY
Raymond A. Parker.
ATTORNEY

C. L. WADE.
RIVETING MACHINE.
APPLICATION FILED JULY 3, 1914.
1,132,988.
Patented Mar. 23, 1915.
6 SHEETS—SHEET 5.
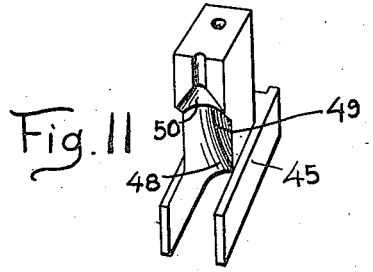
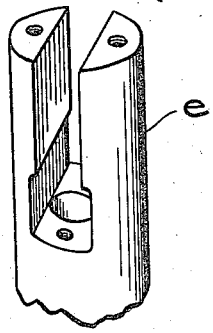
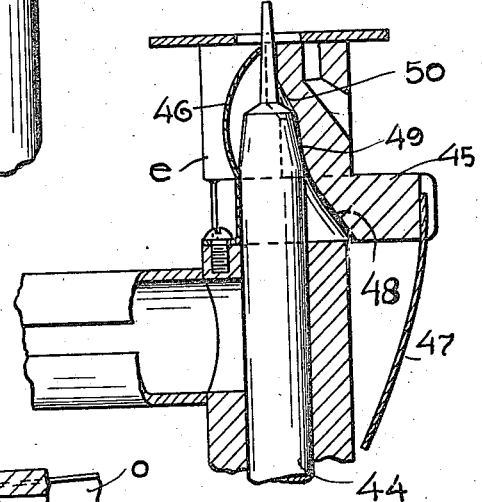
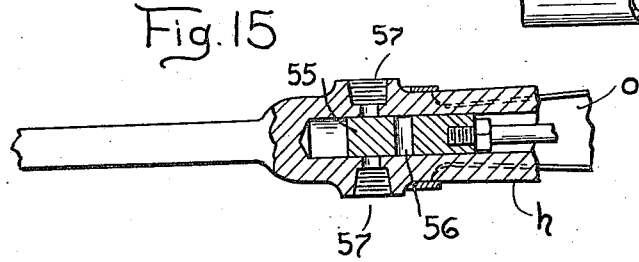
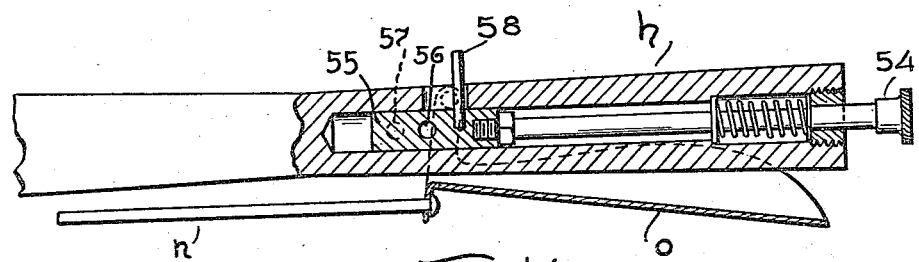
WITNESSES
INVENTOR
Ceylon L. Wade
BY
Ralgemond A Parker.
ATTORNEY C. L. WADE.
RIVETING MACHINE.
APPLICATION FILED JULY 3, 1914.
1,132,988.
Patented Mar. 23, 1915.
6 SHEETS—SHEET 6.
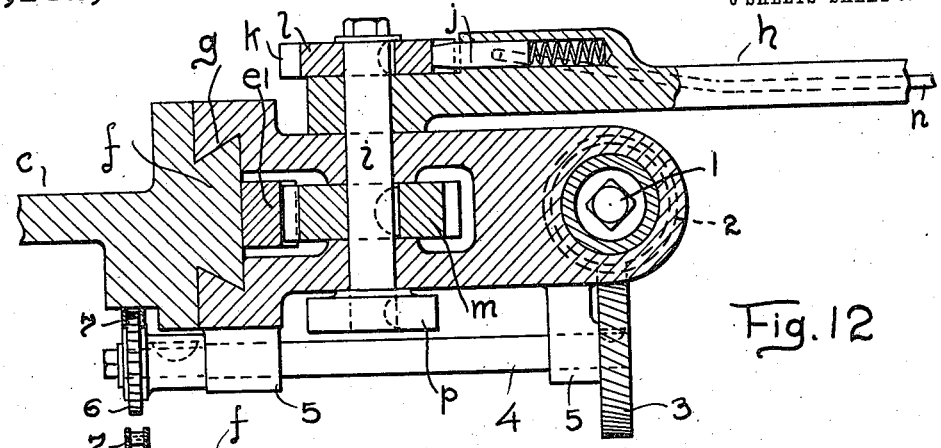
Fig. 12
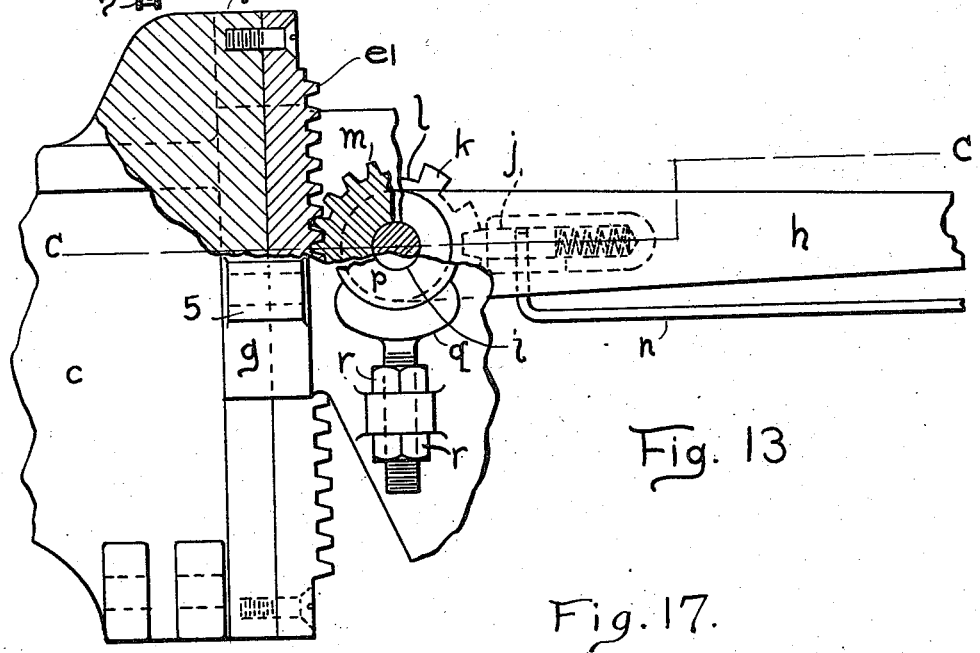
Fig. 13
Fig. 17.
WITNESSES
INVENTOR
Ceylon L. Wade
BY
Ralzemond A. Parker.
ATTORNEY

UNITED STATES PATENT OFFICE.

CEYLON L. WADE, OF DETROIT, MICHIGAN.

RIVETING-MACHINE.

1,132,988.

Specification of Letters Patent. Patented Mar. 23, 1915.

Application filed July 3, 1914. Serial No. 848,735.

*To all whom it may concern:*

Be it known that I, CEYLON L. WADE, a citizen of the United States, residing at Detroit, county of Wayne, State of Michigan, have invented a certain new and useful Improvement in Riveting-Machines, and declare the following to be a full, clear, and exact description of the same, such as will enable others skilled in the art to which it pertains to make and use the same, reference being had to the accompanying drawings, which form a part of this specification.

This invention relates to riveting machines and has for its object a riveting machine which automatically feeds the rivets, makes a hole in the work, and upsets the rivet end.

The machine can be used quite generally in riveting, especially for flat riveting such as riveting sheet metal plates, riveting on trunks, and riveting in connection with shoes, as for instance fastening the plates or spikes on athletic shoes.

The invention also provides means for holding the work during operation of the tool and stripping the work from tool after the operation of the holding tool.

Figure 1:
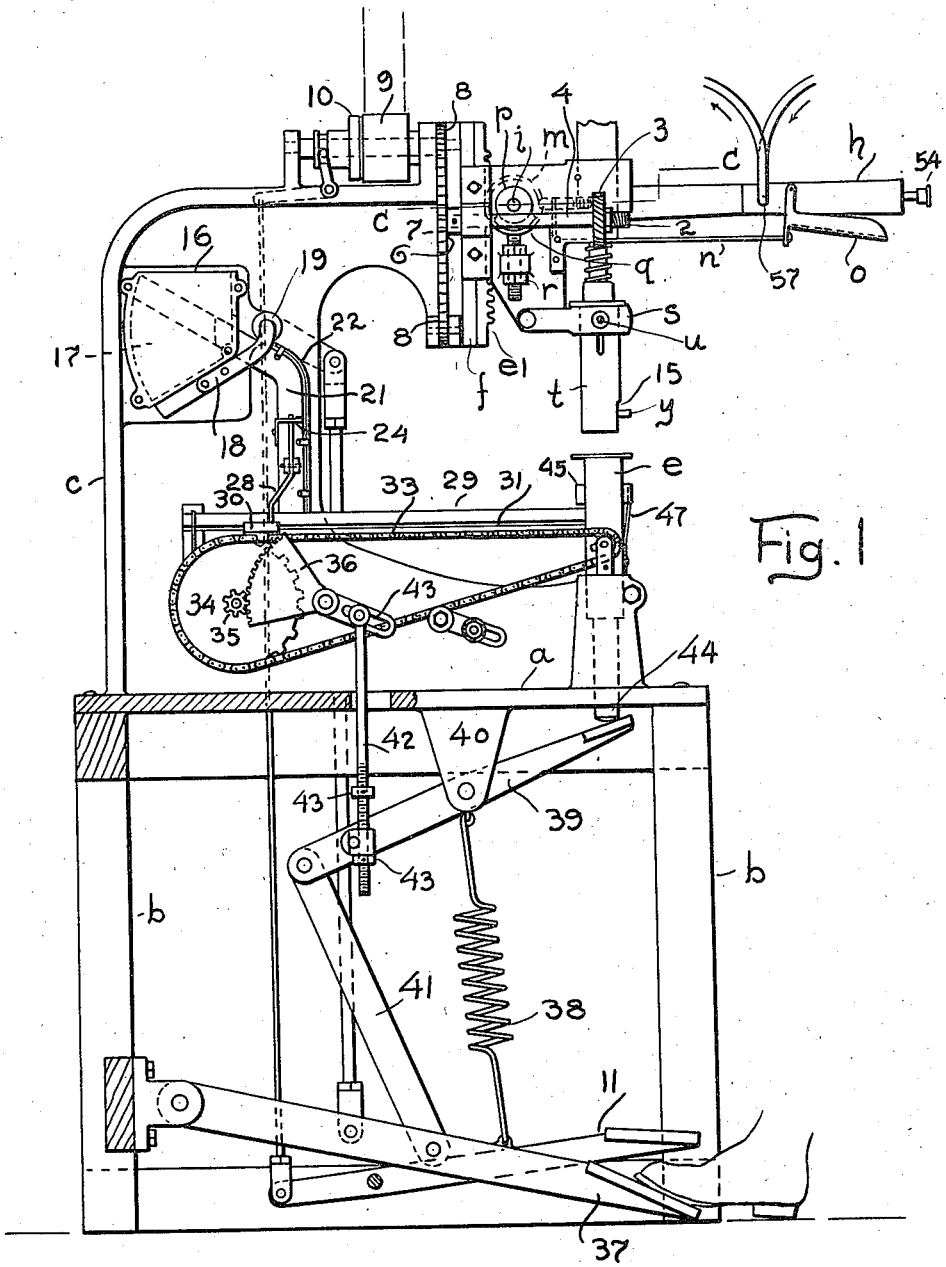
Figure 7:
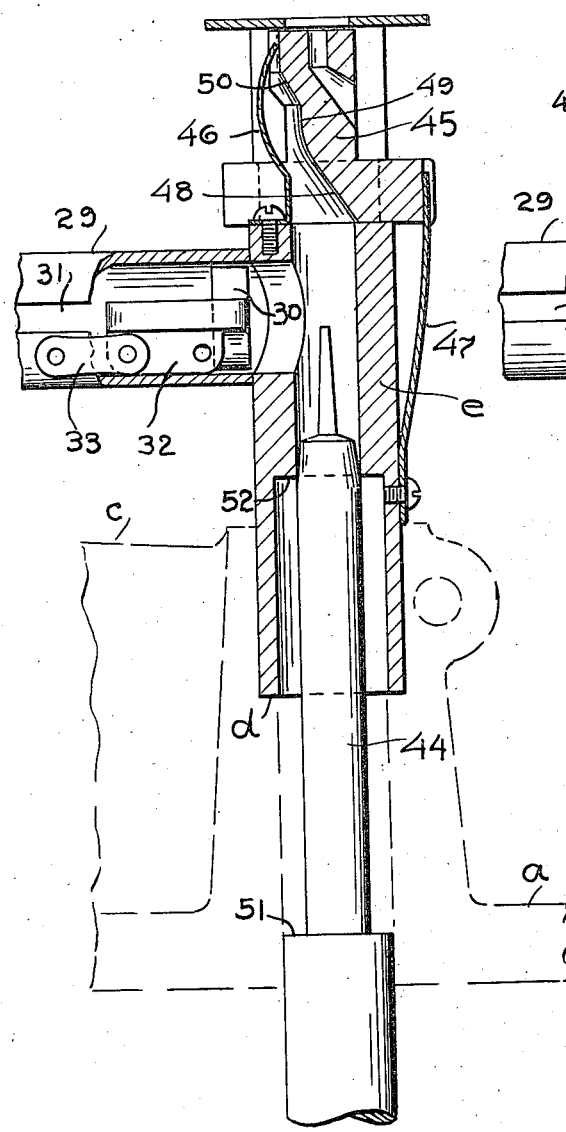
Figure 9:
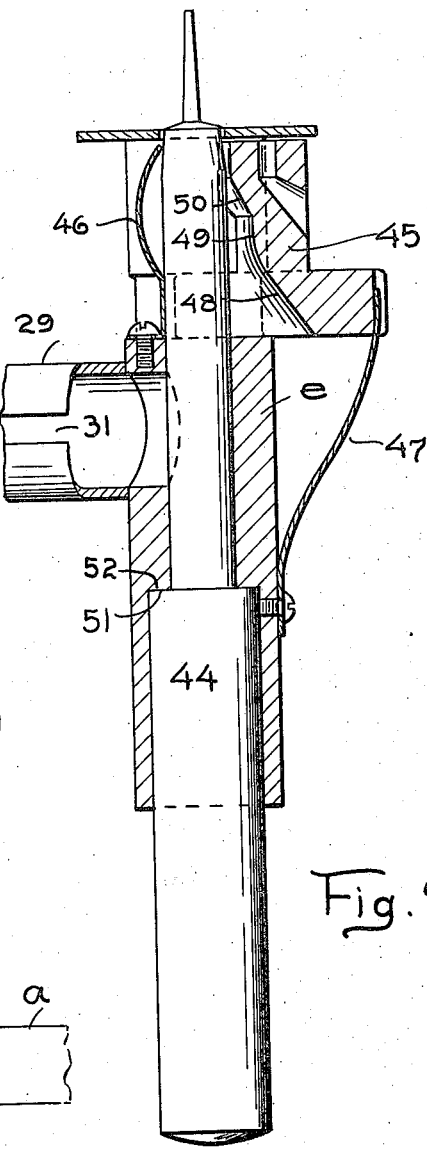

Figure 1, is a side elevation of the machine partly in section. Fig. 2, is a front elevation of the machine. Fig. 3, is a enlarged side elevation of the feeding mechanism. Some of the parts are broken away. Fig. 4, is a section on the line A—A of Fig. 3. Fig. 5, is a section on the line B—B of Fig. 3. Fig. 6, is a detail of the selector device for feeding rivets one at a time. Fig. 7, is a vertical section of the lower work holder, showing in elevation the dolly-bar that feeds the rivet to the work. Fig. 8, is a similar fragmentary section showing the dolly-bar raised part way. Fig. 9, is a section similar to the one shown in Fig. 7 showing the dolly-bar completely raised. Fig. 10, is a perspective of the top of the lower work-holder. Fig. 11, is a perspective of a movable die which is used to hold the work while it is being punched or bored. Fig. 12 is a section on the line C—C of Fig. 1, and the line C—C of Fig. 13. Fig. 13, is a view of the traveling head of the machine in side elevation; also the fixed head of the machine in side elevation. Some of the parts are broken away for showing parts to the rear. It is a view similar to that shown in Fig. 1 but on an enlarged scale. Fig. 14, is a sectional detail of the lever which governs the operation of the traveling head. Fig. 15, is a sectional detail of the same lever but having the plane of the section taken a quarter of a turn removed from the plane of the section shown in Fig. 14. Fig. 16, is a vertical section through the traveling head, showing the boring tool in place. Fig. 17 is a section showing the kind of work the machine does. The rivet is a solid rivet upset to fasten the three flat pieces together.

The machine is shown in its entirety in Fig. 1. Referring to this figure, $a$ indicates the conventional machine bed which is supported by legs $b$. A yoke-shaped frame $c$ is supported upon the bed. The lower jaw of the yoke is shouldered as shown in Fig. 7 at $d$. Into this fits the lower work-holder $e$. Again referring to Fig. 1, it will be seen that the upper jaw of the yoke, which will be called the stationary head of the machine, is provided with the rack $e^1$. In Figs. 12 and 13 this form of construction is shown in detail. This rack is screwed to the dove-tailed tenon $f$. The dove-tail groove $g$ fits about this tenon. The groove and tenon form a track to guide the traveling head upon the stationary head. The lever $h$ (Figs. 12 and 13) is pivoted to the shaft $i$. It carries a spring-pressed dog $j$ which engages with the teeth $k$ of the toothed wheel $l$. By swinging this lever up and down it is evident that it causes the shaft $i$ to turn because the toothed wheel $l$ is fast thereto. The shaft $i$ is fast to the gear wheel $m$ which is caused to travel upon the rack $e^1$. Consequently the movable head is made to rise or drop with respect to the stationary head. This dog $j$ is retractable by the reach rod $n$ (Figs. 12 and 13) which connects with the smaller bell-crank lever $o$ (Fig. 1) at the end of the lever $h$.

The shaft $i$ (Fig 12) extends through the opposite side of the movable head and there terminates with the friction wheel $p$. The periphery of this friction wheel engages with the brake shoe $q$ (Fig. 13 and Fig. 1). This brake shoe has a stem threaded through the nuts $r$ which are on the opposite sides of a laterally protruding bracket. By adjusting these nuts the pressure of the brake shoe upon the friction wheel may be regulated. The bracket and the friction wheel act as a drag so as to hold the lever and the head in any desired position.

The traveling head is provided with a yoke $s$ (Fig. 1 and Fig. 16). These figures also show the barrel $t$ which is provided with a ring at its upper end that holds it from dropping through the yoke. The barrel is slotted and through these slots protrude the threaded pins $u$. These pins engage the lower end of the cap $v$ which screws upon the sleeve $w$.

The sleeve $w$ is provided with an enlargement at its lower end that has a dovetailed recess $x$. Into this recess may be slipped the dove-tailed block $y$ which journals a drill $z$. This tool is provided with a disk-like enlargement having teeth which can positively interlock with the teeth in the end of the spindle 1. Consequently when the block $y$ is in place the drill $z$ is operatively connected with the spindle 1. A portion of the spindle above the cap $y$ is squared (Fig. 16) and this squared portion is slidable through the gear wheel 2. The spring 98 is a cushioning spring to act when the spindle is used as a pneumatic hammer.

The gear wheel 2 is a spiral gear which meshes with another spiral gear 3 (Fig. 2). The gear wheel 3 (Fig. 12) is attached to the shaft 4 which is journaled in the laterally protruding brackets 5 on the side of the traveling head. The opposite end of the shaft 4 carries a sprocket wheel 6 which engages with the chain 7 at one side (Figs. 12, 2 and 1). Referring to Figs. 1 and 2 it will be seen that the chain passes over two sprocket wheels 8 upon the stationary head. The upper sprocket wheel is connected by a shaft with the pulley 9 through the clutch 10. The pulley wheel 9 may be connected with any convenient source of power. The clutch 10 is linked by suitable connections with the pedal 11. The above mechanism is a flexible driving connection between the traveling and the stationary head. Consequently the spindle 1 may be rotated and the drill $z$ caused to work when the clutch 10 throws on the power.

Returning to Fig. 16 the coiled expansion spring 12, engaging at its upper end with the pins $u$ on the yoke $s$, tends to thrust the barrel $t$ downward and away from the yoke $s$ by reason of the lower end of the spring bearing against the inwardly projecting shoulder 13 of the barrel $t$. The barrel $t$ forms the upper work-holder, that is its lower end bears against the work yieldingly for, when the traveling head is forced downward by the operation of the lever and the interaction of the gear wheel and rack, the yoke $s$ of course goes down with the traveling head until the lower end of the barrel $t$ encounters the work. The barrel cannot move farther downward and any further movement of the traveling head is relative with respect to the barrel, because of the yielding connection between the main part of the head and the barrel afforded by the coil spring 12. Sufficient of this relative movement will bring the drill $z$ against the work and as the drilling progresses further relative movement will allow it to drill through the work. The expansion or split ring 99 frictionally holds the sleeve $w$ in the barrel so that it prevents the sleeve from dropping with respect to the barrel when the drilling tool is lifted out of the work and while the riveting is occurring. The work is stripped off the drill by lifting the traveling head. This relieves the pressure upon the coil spring 12. The coil spring then expands against the shoulder 13 forcing the end of the barrel against the work while the drill $z$ is lifted out of the work and stripped therefrom. A further movement of the traveling head upward allows the removal of the work if desired. However such removal is not effected during the ordinary operation of the machine but the barrel is left in firm engagement with the work to hold it accurately in place, while the rivet is fed to it and riveted down. The block $y$ extends to the outside of the barrel so that it may be withdrawn by hand while the riveting is being done (see Fig. 1). A slot 15 is provided in the side wall of the barrel.

Rivets are carried in the receptacle 16 (Figs. 1, 3 and 4). This receptacle is bolted to the side of the yoke frame and is provided with a sloping bottom, as shown in Fig. 4. A segment 17 is bolted to the arm 18 which is journaled in the boss 19 of the frame. Consequently the segment 17 may be swung from the position shown in Fig. 3 to the very bottom of the receptacle. The top of the segment is provided with a groove 20. When this segment is swung to its lowermost position it is at the extreme bottom of the receptacle; consequently the whole pile of rivets is over the slot. As the segment is lifted back to position shown in Fig. 3 some of the rivets will tumble into the slot so their stems remain in the slot, while their heads protrude above the slot, as shown in Fig. 3. In the uppermost position the slot of the segment is on the same incline as the race-way 21 which connects with the side of the receptacle. This race-way is formed by a bar provided with a deep slot. The race-way turns a short distance from the receptacle and drops vertically. This requires the use of a strip 22 to prevent the rivets spilling out.

About half way down the vertical run of the race-way is a pair of holes 23, one on each side and one below the other. A two-part slide 24 (Fig. 6) is mounted to slide transversely of the race-way by reason of the slot 25 through which protrude the pins 26 on the back of the race-way. The slide has an arm on each side of the race-way and each arm is provided with a rest 27 which protrudes through the hole 23. One rest is on one side of the race-way and one on the other and one rest is below the other. The two arms are adjustable toward and away from each other vertically by the slots and screws shown in Fig. 6. This alters the distance between the rests to accommodate different sized rivets.

Again referring to Fig. 6, it will be evident that when the slide 24 is pulled to the left in this figure the rivet just above the upper rest will drop; before it can drop below the lower rest that member crosses the groove in the race-way and catches the rivet. When the slide is moved back it is evident that the rivet on the lower rest will be free to drop down the race-way while the upper rest will prevent any more rivets dropping onto the lower rest or down the race-way. This slide, therefore, operates at each stroke and return to select one rivet and drop it to the bottom of the race-way. The slide is operated by a lever 28 that is actuated by a cam, to be hereinafter described.

Referring to Fig. 3, the rivet drops into the tube 29 and in front of the plunger 30. The plunger 30 has a side extension that protrudes through the side slot 31 in the tube and is fastened as one of the links 32 to the chain 33 (Fig. 7). This chain passes over a large sprocket wheel 34 to which is attached a small gear wheel 35 in mesh with the toothed segment 36. This transmission multiplies the speed and peripheral travel considerably. Consequently when the foot is removed from the pedal 37 (Fig 1) the coil spring 38 pulls the pedal up causing the lever 39 that is pivoted to the suspended bracket 40 of the bed *a* to rise at its rear end by reason of the connecting link 41. To this lever 39 is attached a rod 42 provided with a pin that engages in the slot 43 in the tail of the segment. This causes the segment to descend and rotates the large sprocket wheel clockwise, causing the plunger 30 to travel forward in the tube 29 carrying the rivet ahead of it. The connection between the rod 42 and the lever 39 is a lost motion one and the exact point at which the rod is brought into operative relation with the lever can be governed by adjusting the nuts 43 upon the screwthreaded portion of the rod. This adjustment is quite essential in order to properly time the plunger 30 so that it travels just the proper distance in performing its work. Referring to Fig. 7, the plunger 30 will be seen at the forward end of its travel. This is at the mouth of the tube which leads into the bore of the lower work holder *e*. When the plunger reaches this last-mentioned position, the rivet will drop through the opening head-first and will rest upon the top of the dolly-bar 44. The end of this dolly-bar protrudes down through the lower jaw of the frame and is engaged by the free end of the lever 39. Consequently when the foot brings the pedal 37 down again the dolly-bar is forced upward. However, by reason of the lost motion connection between the lever 39 and the rod 32, the plunger 30 tarries at the mouth of the tube until the rivet passes, so that there is no danger of its being forced out of this opening. As the dolly-bar is forced upward the rivet encounters the die 45 which has acted as a work support while the drilling operation was being performed.

Referring to Figs. 10 and 11, the exact form of tube of the holder *e* and the die 45 will be seen. The die 45 is slidably held in the slot in the end of the holder by the two springs 46 and 47. The spring 47 is the master spring and of considerably more strength than the other spring. The spring 46 operates to hold the die from being forced out by the force of the master spring 47 and also prevents the rivet from being forced out as it travels upward. Referring to Fig. 8, it will be seen that as the dolly-bar passes it meets the inclined face 48 of the die 45. This will push the die 45 to the side. The dolly-bar then travels for a little distance over the vertical face 49 of the die. This serves to center the rivet with respect to the hole that has been drilled in the work and consequently guides the rivet into that hole. Further upward progress of the dolly-bar results in the end of the dolly-bar encountering the second inclined face 50 of the die. This contact completely throws the die to the side, as shown in Fig. 9, and the dolly-bar reaches its uppermost position, the limit of which is marked by the shoulder 51 (Fig. 9) of the dolly-bar encountering the shoulder 52 of the bore of the lower work holder *e*.

It now remains to upset the upper end of the rivet, for this has now passed through the work. This is accomplished by reciprocating the spindle 1 (Fig. 16). It will be seen that the end of the spindle has a cup recess 53. This comes down upon the end of the rivet and gives it a rounded head. Of course the end of the spindle may be changed to form any shaped head. This spindle may be forced up and down by different known means but most conveniently, probably, by an air cylinder and piston (not shown). The control, however, for such a fluid cylinder and piston is shown in Figs. 14 and 15. By pressing on the push rod 54 in the end of the lever *h*, the piston valve 55 can be forced inward bringing the passageway 56 in the valve into registry with the oppositely disposed openings 57 in the fluid line. This valve may be also worked by the finger 58 which protrudes through the top of the lever (Fig. 14).

Referring to Fig. 5, it will be seen that the top of the plunger 30 is provided with a cam groove 31; into this protrudes the end of the lever 28 which operates the slide. Consequently upon the return of the plunger from the forward end of the tube, the slide, as shown in Fig. 6, is pushed to the right, dropping a rivet before the plunger from off the lower rest. As the plunger starts forward again the lever is again actuated and the slide pulled to the left (Fig. 6) dropping a rivet from the upper onto the lower rest which will be dropped in front of the plunger when it returns again. The slide and the cam which operates the same will be broadly referred to as a selector.

The mode of operation is evident from the description of the functions of the parts which have already been given.

What I claim is:

1. In a riveting machine, the combination of a stationary head, a movable head, means for causing the movable head to have relative movement with respect to the stationary head, the said movable head comprising a barrel, a spring for forcing the barrel downward with respect to the other parts of the head and a spindle within said barrel.

2. In a riveting machine, the combination of a stationary head, a traveling head, and means for causing the traveling head to move relatively with respect to the stationary head, the said traveling head comprising, among other parts, a barrel in slidable relation with other parts of the head, a spring for forcing the barrel yieldingly downward with respect to the other parts, a sleeve contained within the barrel, a spindle within the sleeve, a block slidable into the lower portion of the sleeve and provided with a tool having positive means for engagement with the end of the spindle.

3. In a riveting machine, the combination of a spindle provided with a squared portion, a gear wheel for driving the said spindle in rotation, having a squared opening through which passes the squared portion of the spindle in slidable relation, and a guide or sleeve for the spindle and a block provided with a drill slidable into the lower end of the sleeve to detachably connect the drill in the block with the spindle, said spindle being slidable vertically to act as a hammer when the drill is detached.

4. In a riveting machine, the combination of a stationary head, a movable head, a rack on the stationary head, a gear wheel on the movable head, and means for rotating the gear wheel so it will travel upon the rack, said head being provided with a barrel yieldingly forced downward with respect to the other parts of the head, and a spindle suitably guided within said barrel.

5. In a riveting machine, the combination of a stationary head, a movable head guided thereupon, a rack upon the stationary head, a gear wheel upon the movable head, and means for rotating the gear wheel upon the rack, the said head being provided with a barrel yieldingly pressed downward with respect to the other parts of the head, a rotatable spindle located in said barrel, and flexible driving connections between said spindle and the stationary head.

6. In a riveting machine, the combination of a stationary head, a movable head guided thereupon, and means for causing the movable head to travel upon the stationary head, the said movable head being provided with a yoke $s$ provided with pins $u$, a barrel $t$ having slots through which the pins $u$ protrude, a spring 12 for forcing the barrel yieldingly downward with respect to the yoke $s$, and a spindle 1 located within the barrel.

7. In a riveting machine, the combination of a stationary head, a traveling head, and means for causing the traveling head to travel upon the stationary head, the said traveling head being provided with a yoke $s$ having pins $u$, a barrel provided with slots through which the pins protrude and slidable in said yoke, a spring 12 engaging at one end against the pins and at the other end upon a shoulder on the barrel, a sleeve $w$ within the barrel and having a frictional engagement with the barrel, a spindle guided within said sleeve, and a block slidable into the lower portion of the sleeve, the said block being provided with a tool which can be brought into positive interlock with the spindle.

8. In a riveting machine, a tool for making a hole in the work, a die for holding the work and operating thereunder in conjunction with the said tool, a dolly-bar for forcing the die aside and a rivet up through the work, guiding means for supporting the die, guiding the same in its sliding action and for guiding the dolly-bar, and yielding means for resisting the movement of the die to the side.

9. In a riveting machine, a tool for making a hole in the work, a die for supporting the work and operating thereunder in conjunction with the tool, a lower work holder which supports the die and allows it to slide to one side, a dolly-bar for forcing the die to one side and the rivet up through the work, and means for resisting the tendency of the dolly-bar to force the die to one side.

10. In a riveting machine, the combination of a tool for making a hole, a die for supporting the work and operating thereunder in conjunction with the tool, a workholder for holding the die and allowing it to slide to one side, said work-holder being provided with an interior bore, spring means for holding the die yieldingly in its working position, the said die being provided with an inclined face, and a dolly-bar for rising in the bore of the workholder and engaging the inclined face of the die to force it aside and push the rivet through the work.

11. In a riveting machine, the combination of a tool for making a hole in the work, a die for supporting the work and operating thereunder in conjunction with the tool, a work-holder arranged to allow the die to slide to the side thereof, said work-holder being provided with an interior bore, spring means for normally holding the die in its working position, the said die being provided with two inclined faces and one vertical face, and a dolly-bar for rising in said bore encountering the first inclined face then the vertical face which centers the rivet with respect to the hole in the work, and finally the second inclined face which completely pushes the die to the side.

12. In a riveting machine, a work-holder, a tube provided with a slot in its side leading to the work-holder, means for feeding rivets one at a time into the tube, a plunger capable of reciprocation in said tube, a chain for reciprocating said plunger, a sprocket over which said chain passes, a pedal provided with connections for rotating the sprocket wheel.

13. In a riveting machine, the combination of a work-holder provided with a bore, a slotted tube leading into the bore, a dolly-bar adapted to rise and fall in the bore of the work-holder, means for feeding rivets one at a time into the tube, a plunger adapted to be reciprocated in the slotted tube, a chain for reciprocating the plunger, a sprocket wheel over which the chain passes, a pedal and connections between the pedal and the sprocket wheel, including a lost motion connection for causing the plunger to tarry at the end of the tube which opens into the bore of the holder so as to prevent the rivet from being forced out while the dolly-bar passes.

14. In a riveting machine, the combination of a work-holder provided with a bore, a dolly-bar that rises and falls in the bore, a slotted tube connecting with the interior of the bore, means for feeding rivets one at a time into the tube, a plunger adapted to reciprocate in the tube, means for driving the plunger back and forth, a lever for actuating the said last-mentioned means and also for actuating the dolly-bar, and a pedal for actuating said lever.

In testimony whereof, I sign this specification in the presence of two witnesses.

CEYLON L. WADE.

Witnesses:
ROBERT P. VAN BUSKIRK,
STUART C. BARNES.